United States Patent [19]
Ergon

[11] 3,836,949
[45] Sept. 17, 1974

[54] DEVICE FOR THE LOCALISATION OF AN OBJECT

[75] Inventor: Rolf Otto Torbjörn Ergon, Karlskoga, Sweden

[73] Assignee: Aktiebolaget Bofors, Bofors, Sweden

[22] Filed: Mar. 27, 1972

[21] Appl. No.: 238,224

[30] Foreign Application Priority Data
Apr. 2, 1971  Sweden.............................. 4303/71

[52] U.S. Cl. ............... 340/3 R, 340/3 E, 340/3 FM, 343/7.5
[51] Int. Cl............................................. G01s 9/66
[58] Field of Search............ 343/7 PF, 7.5; 340/3 E, 340/3 FM, 3 R

[56] References Cited
UNITED STATES PATENTS
3,381,292  4/1968  Hansen............................ 343/7.5 X
3,614,719  10/1971  Treacy............................. 340/3 EX Primary Examiner—Richard A. Farley
Attorney, Agent, or Firm—Pollack, Philpitt & Vande Sande

[57] ABSTRACT

An improved echo-sounding device is disclosed which is suitable for use in an acoustic proximity fuse of an underwater weapon. The transmitter of the device is controlled so that predetermined electrical pulse sequences, including at least two different types of pulses, which are produced by the transmitter and then converted into acoustic signals transmitted into the surrounding medium, are varied in response to electrical echo-pulses registered by a receiver and converted from reflected acoustic signals, the receiver being arranged to register only pulses of a type corresponding to the last generated pulse. By varying the predetermined pulse sequence to generate a pulse of the same type as last generated and thereafter continuing with the same sequence as before, only objects inside the range of action of the weapon can cause continuously registered echo pulses.

6 Claims, 18 Drawing Figures

DEVICE FOR THE LOCALISATION OF AN OBJECT

BACKGROUND OF THE INVENTION

This invention relates to an echo-sounding device particularly an echo-sounding device for locating objects within a particular range in a surrounding medium, comprising:
- a transmitter for generating a predetermined sequence of at least two different types of electric pulses with equal time intervals between pulses;
- said transmitter including means for converting the electric pulses into corresponding acoustic signals and emitting these into the medium;
- a receiver for receiving acoustic signals reflected from objects and for converting these back into corresponding electrical echo-pulses; and
- means adapted to register only echo-pulses of the type corresponding to the type of pulse last generated.

Such a device is used, for example, in acoustic fuses which are actuated from a distance, so-called acoustic proximity fuses, which can be used to advantage in various types of underwater weapons, such as torpedos, mines, depth charges, etc. In such applications, the acoustic signals transmitted by an electro-acoustic transducer forming part of the transmitter will be reflected by objects located in the surrounding water, e.g., enemy ships which it is the intention to combat. Further, the receiver is in such cases arranged to transmit the electrical echo pulses registered by a trigger unit, in order to obtain the function desired in this connection, in this application the detonation of an explosive charge carried by the underwater weapon in question. The trigger unit is then often arranged so that it will perform the function desired only in cases when the echoes registered by the receiver occur with a predetermined frequency. The individual electrical pulses and therewith also the corresponding acoustic signals usually differ as regards their oscillation frequency, and are emitted with a given pulse repetition frequency and in a predetermined sequence. The pulse repetition frequency and the wave propagation velocity of sound in the surrounding medium, i.e., in this case water, determine the range within which an object must be located in order that a pulse reflected by the object shall give rise to an echo registered in the receiver. Since the receiver is arranged so that in the time interval between the pulses it will be sensitive only to the echo-pulses which originate from pulses of the type last generated, objects in an area just outside the range will give rise to echo-pulses to which the receiver is not sensitive at the instant of reception. With a finite number of types of pulses $n$, the area within which objects cannot give rise to echo-pulses registered by the receiver extends from the range limit to a distance of n times the range. Objects within the distance interval $n$ to $n+1$ times the range give rise to echo-pulses to which the receiver is sensitive. In order that objects at such distances from the locating device shall not be detected and thereby cause triggering, (for example, in the proximity fuse application, triggering of the explosive charge carried by the underwater weapon in question), it is necessary that the signals be damped by reflection by the object and through the wave propagation in the medium to a level which is lower than the threshold level of the receiver.

This last-mentioned type of echo-sounding device, which represents the present state of the art, has two chief drawbacks. Firstly, the number of different types of pulses n selected must be so great that echo signals originating from objects within the distance interval of $n$ to $n+1$ times the range have a signal level below the threshold level of the receiver, which in case there is a desire to have a high pulse repetition frequency and a corresponding short range, requires such a great number of different types of pulses that the echo-sounding device will be of an extremely complicated and costly design. Secondly, two similar echo-sounding devices of this kind which operate independently of one another can interfere with each other at a distance considerably greater than the range of each. Such interference can occur entirely independently of the number of different types of pulses, as the displacement in time between the sequences in which the signals are emitted from the two devices, and the distance between the devices may always happen to coact so that at least one of the devices will interfere with the other.

The above-mentioned drawbacks naturally involve a limited scope of use of such locating devices. It should be obvious that these cannot be used as proximity fuses in torpedoes which, for instance, as a consequence of simultaneous firing from the respective firing positions will advance in parallel, even if the distance between them considerably exceeds the range of the respective devices.

SUMMARY OF THE INVENTION

According to the invention there is provided an echo-sounding device for locating objects within a particular range in a surrounding medium, comprising:
- a transmitter for generating a predetermined sequence of at least two different types of electric pulses with equal time intervals between pulses and for converting the electric pulses into corresponding acoustic signals and emitting these into the medium;
- a receiver for receiving acoustic signals reflected from objects and for converting these back into corresponding electrical echo-pulses, and adapted to register only echo-pulses of the type corresponding to the type of pulse last generated, and
- control means adapted to achieve influence of said registered echo-pulses on said predetermined sequence.

With the echo-sounding device hereinafter described it is thus possible to achieve even with a very limited number of different types of pulses that no objects outside the range used can give continuously registered echo-pulses and also that two similar devices at a distance from one another exceeding twice the range cannot interfere with each other continuously through direct signals.

BRIEF DESCRIPTION OF THE DRAWINGS

By way of example, a specific embodiment of the invention will be described with reference to the accompanying drawings, in which.

DESCRIPTION OF THE PREFERRED EMBODIMENT

Figure 1:
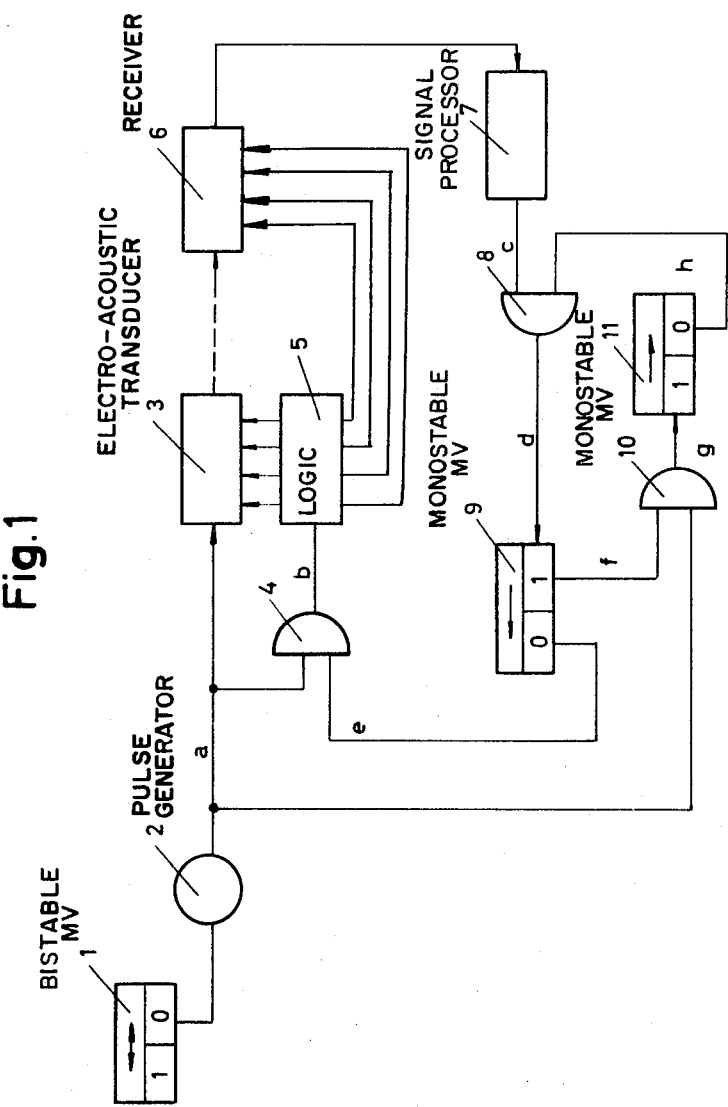
FIG. 1 shows a block diagram of the device.
Figure 2:
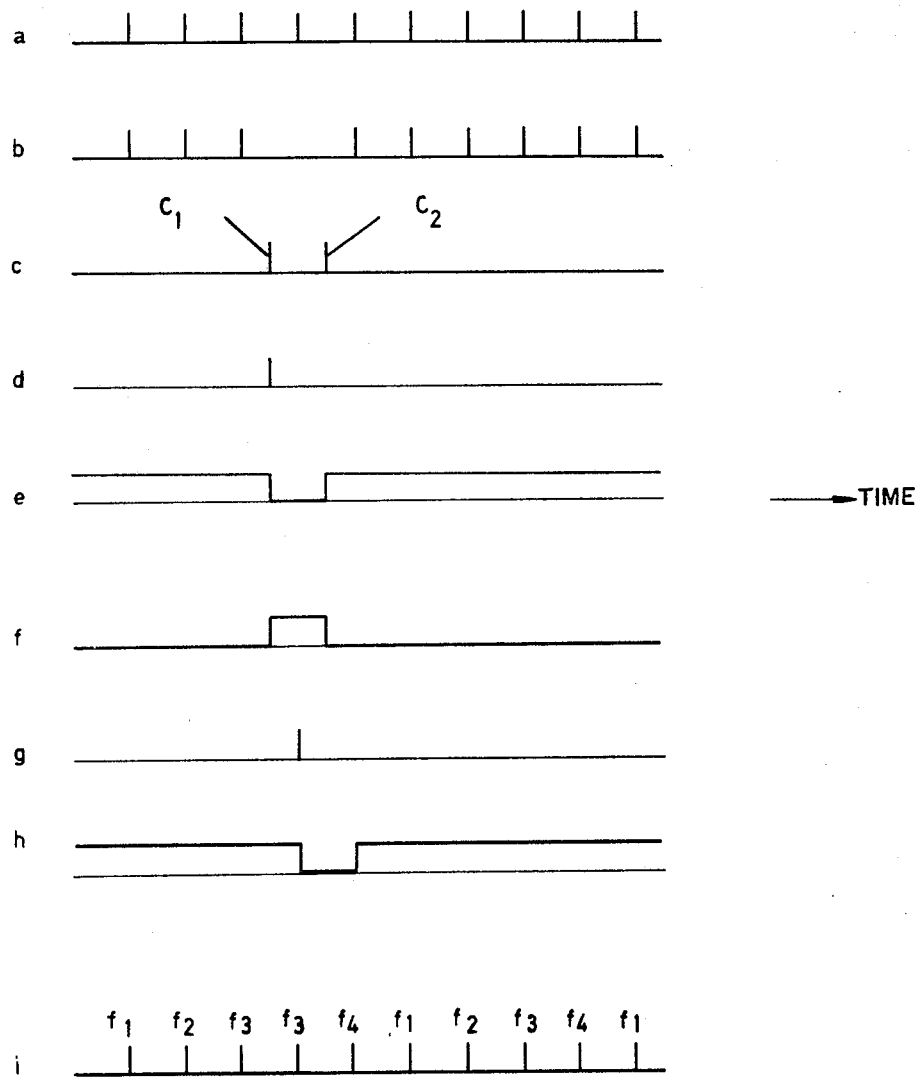
FIGS. 2 (a–i) show the appearance of the signals at different points in the block diagram according to FIG. 1.

In FIG. 1, a bistable multivibrator via a pulse generator 2, gives rise to a train of pulses at a point a, the appearance of which will be noted from FIG. 2a. This train of pulses controls pulses transmitted through an electro-acoustic transducer 3 as regards the pulse repetition frequency and the pulse length. A first AND-gate 4 has one of its inputs connected to the point a. At this gate, a pulse train according to FIG. 2b is obtained at a point b, which controls a logic unit 5 governing the transmission frequency of the electro-acoustic transducer 3. As long as no echo is registered by a receiver 6, the pulse train at point b is identical to the pulse train at point a, which means that the transmission frequency is shifted one step by logic unit 5 according to a predetermined sequence for each successive pulse to be transmitted. When the receiver 6 registers a first echo, a first pulse $c_1$ is obtained (see FIG. 2c) via a signal-processing unit 7 connected to the receiver, on the output c of this unit, which first pulse via a second AND-gate 8 produces a pulse on the output d of the gate 8, as shown in FIG. 2d. The last-mentioned pulse triggers a monostable multivibrator 9, so that a pulse (see FIG. 2e) with a length equal to the interval between two pulses is obtained on the second input e of the first gate 4. The pulse at point 3 prevents the next pulse at point a from passing the gate 4. One pulse in the pulse train at point b will thereby be omitted, which means that the previously mentioned step shifting of the transmission frequency performed by the logic unit 5 will also be omitted. This means that the transmission frequency sequence will instead be delayed one step by reason of the pulse type last generated being repeated. The appearance in time of the pulse train transmitted from the transmitter 3 will be noted from FIG. 2i. When the monostable multivibrator 9 is triggered, a pulse (see FIG. 2f) is also obtained which has a length which is equal to the interval between two pulses at a point f. This pulse goes in on one input of a third AND-gate 10, and this gate is then opened so that the nearest following pulse at point a, to which the second input on the gate 10 is connected, gives a pulse (see FIG. 2g) on the output g of the gate 10, which pulse triggers a further monostable multivibrator 11. This multivibrator then emits a pulse (see FIG. 2h) with a length equal to the interval between two pulses on its output h thereby closing the second gate 8 during the corresponding time. Thereby, the step shifting in the transmission frequency cannot be prevented during the nearest following transmission interval, even if a second pulse $c_2$ (see FIG. $2_c$) should occur on the output of the signal processing unit 7 as a consequence of a second echo registered in the receiving unit 6.

Figure 3A:
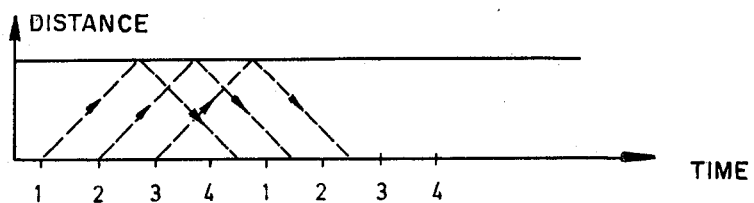
FIGS. 3, a, b, and c, show how objects at different distance intervals act upon the device.
Figure 3B:
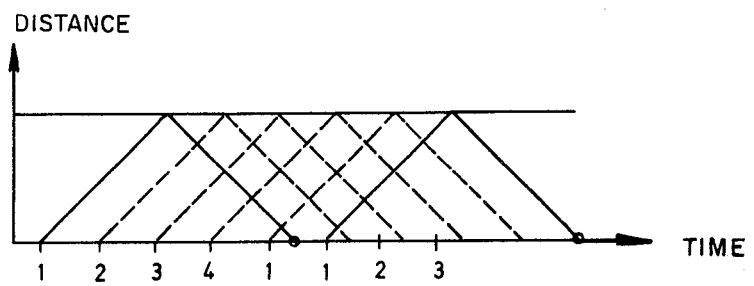
Figure 3C:
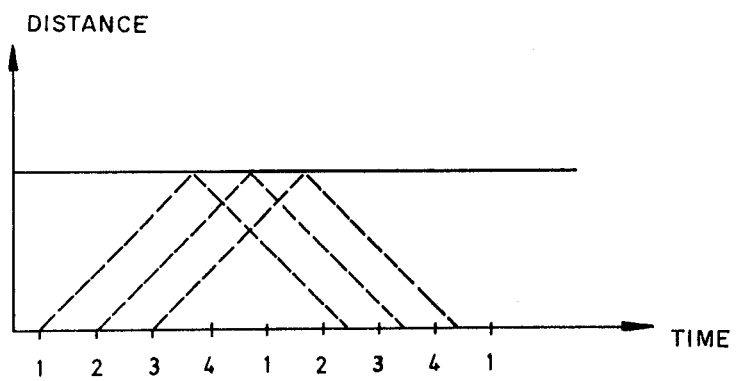
Figure 4A:
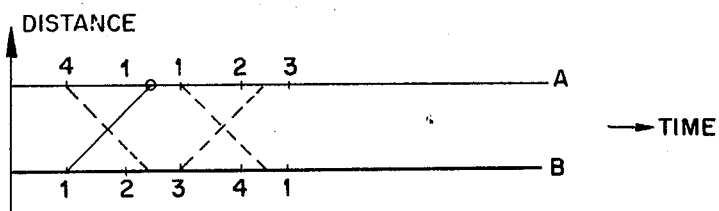
FIGS. 4, a, b, c and d, show how two similar devices interact.
Figure 4B:
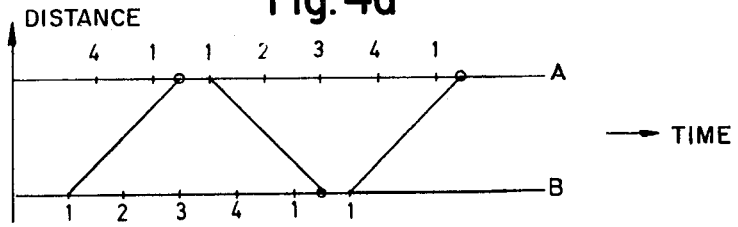
Figure 4C:
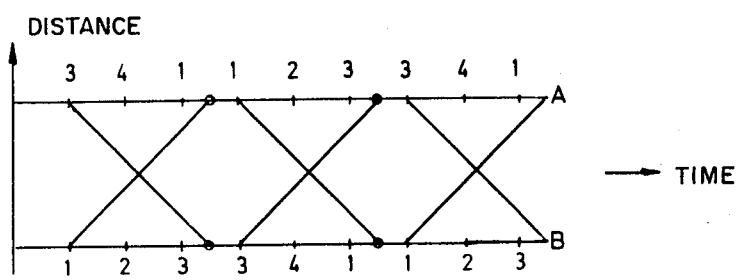
Figure 4D:
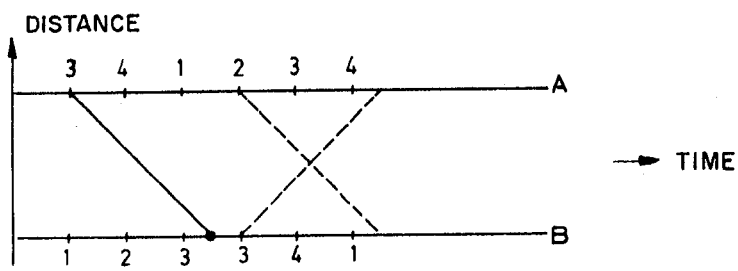

FIG. 3 shows how objects at various distances from a device according to the invention influence the device. In FIG. 3a, the distance between the device and the object is less than 4 times the range, so no echoes are registered. In FIG. 3b the distance between the device and the object is four to five times the range, and echoes are then registered in every fifth interval. From FIG. 3b it will be noted that if there were no delay of the transmission frequency sequence, continuous registration of echoes could take place. In FIG. 3c, the distance between the device and the object is more than five times the range, and again no echoes are registered.

FIG. 4 shows how two devices A and B at different distances from each other interact. In FIG. 4a the distance between them is three times the range, and then only occasional interference echoes can be obtained in one of the devices A. The same applies to the distances between the devices around 2, 3, 6, 7, 10, 11 etc. times the range, and both of the devices A and B can then obtain interference echoes in every fifth interval. The same applies to distances around 8, 12 etc times the range. In FIG. 4c, the distance between the devices is five times the range, and both of the devices A and B can then receive interference echoes at every third interval. The same applies to a distance between the devices around 9, 13 etc. times the range. From FIGS. 4a and b it will be noted that if there were no delay in the transmission frequency sequence, at certain distance and time relations the device A would have been subjected to continuous interference. From FIG. 4c it will be noted that, in the corresponding way, the devices A and B are subjected to continuous interference in every third interval. If, as is often the case in practice, in the beginning the interference is in only one direction, e.g., from the device A to the device B, if the distance between them is equal to five times the range, the more favourable process according to the FIG. 4d, will be obtained, and only occasional intererence pulses will be received in the device B.

Figure 5:
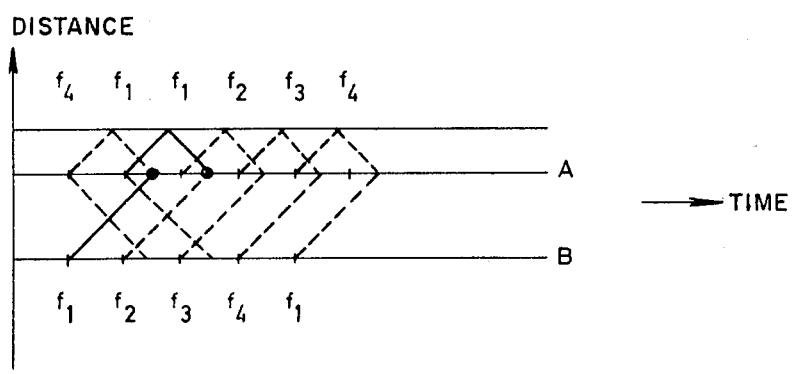
FIG. 5 shows how echo signals arising from an object outside the range and direct signals from a second interfering device act on a first device.

In FIG. 5 it is shown how, in a first device A according to the invention, echo signals occurring simultaneously from an object outside the range and from a second interfering device B act on the device A. In this case, the distance to the object is equal to 1.5 times the range, while the distance to the interfering device B is equal to three times the range. If there were no delay in the transmission frequency sequence, the device B would have interfered with the device A continuously. However, the delay of the transmission frequency sequence must not be repeated more often than for every second interval, as otherwise objects at a distance from the device of between one and two times the range would have resulted in a successively continuous delay of the sequence, and continuous registration of the echo signals would have taken place.

The embodiment described can of course be modified within the scope of the following claims. Thus, a device using a delay of the transmission frequency, depending on the registered echo signals, could be equipped with means for changing said sequence according to certain patterns. Further, the electronic circuits for achieving the influence of the registered echo signals on the transmission frequency sequence can of course be made in a number of different ways.

What is claimed is:

1. An echo-sounding device responsive to objects within a predetermined range in a surrounding medium comprising:
    a transmitter for generating a series of pulses at a predetermined repetition rate and including means for converting the electric pulses into corresponding accoustic signals and emitting these into the medium, means for controlling said transmitter to vary a distinctive characteristic of each said transmitted pulse from one pulse to the next in a predetermined cyclical manner, a receiver for receiving accoustic signals reflected from objects and for converting the received signals into corresponding electrical echo pulses, means controlling said receiver to provide an output in response to an echo pulse only if the echo pulse has its said distinctive characteristic the same as that of the pulse which was last generated by said transmitter, and means responsive to the receipt of a reflection signal having the same said predetermined characteristic as the last-transmitted pulse for rendering said transmitter controlling means effective to control the next generated pulse to have its said distinctive characteristic different from that normally provided by said controlling means in the absence of said reflection signal, whereby the reception by said receiver in the pulse period immediately following the transmission of said next-generated pulse of a reflection pulse having said different distinctive characteristics ensures that said reflection pulse is being provided by an object within said predetermined range.

2. An echo-sounding device according to claim 1 wherein in response to a received echo-pulse said transmitting control means varies said series of pulses so that the transmitter generates a pulse of the same type as that last generated and thereafter continues with said series as before.

3. An echo-sounding device as claimed in claim 2 wherein said transmitting control means varies said series of pulses in response to echo-pulses registered by said receiver so that not more than two successive pulses of the same type are generated.

4. An echo-sounding device according to claim 3 wherein the transmitter comprises a pulse-generating unit for generating a sequence of timing pulses to govern the repetition frequency and length of said electrical pulses, and a logic unit for governing said predetermined sequence;

and wherein the control means comprises three AND-gates and two monostable multivibrators the first AND-gate having its output connected to the logic unit, one input connected to the output of the pulse generating unit, and the other input connected to one of the outputs of the first monostable multivibrator;

the second AND-gate having one of its inputs connected to the receiver to receive a signal when an echo-pulse is registered, its other input connected to one of the outputs of the second monostable multivibrator, and its output connected to the input of the first monostable multivibrator; and the third AND-gate having one of its inputs connected to the other output of the first multivibrator its other input connected to the output of the pulse train generator and its output connected to the input of the second monostable multivibrator.

5. An echo-sounding device according to claim 1, wherein the electric pulses differ in oscillation frequency.

6. An echo-sounding device according to claim 1, wherein the transmitter generates electric pulses of four different types.

* * * * *